(12) United States Patent
Ueda et al.

(10) Patent No.: US 11,069,089 B2
(45) Date of Patent: Jul. 20, 2021

(54) INFORMATION PROCESSING APPARATUS, INFORMATION PROCESSING METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kanagawa (JP)

(72) Inventors: Hiroki Ueda, Suginami Tokyo (JP); Shun Okuno, Kawasaki Kanagawa (JP); Hisao Yoshioka, Chofu Tokyo (JP)

(73) Assignees: KABUSHIKI KAISHA TOSHIBA, Tokyo (JP); TOSHIBA DIGITAL SOLUTIONS CORPORATION, Tokyo (JP)

( * ) Notice: Subject to any disclaimer, the term of this patent is extended or adjusted under 35 U.S.C. 154(b) by 95 days.

(21) Appl. No.: 16/260,367

(22) Filed: Jan. 29, 2019

(65) Prior Publication Data
US 2020/0027244 A1   Jan. 23, 2020

(30) Foreign Application Priority Data
Jul. 23, 2018 (JP) .............................. JP2018-138024

(51) Int. Cl.
*G06T 7/90* (2017.01)
*G06K 9/00* (2006.01)
*G06K 9/60* (2006.01)
*G06N 3/08* (2006.01)
*G06K 9/32* (2006.01)

(52) U.S. Cl.
CPC ............ *G06T 7/90* (2017.01); *G06K 9/00281* (2013.01); *G06K 9/3233* (2013.01); *G06K 9/605* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2001/0022853 | A1* | 9/2001 | Takaoka | G06T 7/90 382/167 |
| 2006/0062435 | A1 | 3/2006 | Yonaha | |
| 2006/0078224 | A1* | 4/2006 | Hirosawa | H04N 5/2353 382/284 |

(Continued)

FOREIGN PATENT DOCUMENTS

| | | |
|---|---|---|
| CN | 105513013 | 4/2016 |
| JP | 2006350621 A * | 12/2006 |

(Continued)

*Primary Examiner* — Jiangeng Sun
(74) *Attorney, Agent, or Firm* — Amin, Turocy & Watson, LLP

(57) ABSTRACT

According to an embodiment, an information processing apparatus includes an extraction unit and a generation unit. The extraction unit is configured to use a learning model that extracts a combining region from a subject image to extract the combining region from a first subject image of a first subject. The generation unit is configured to generate a combined image obtained by combining the extracted combining region with a target region of a corrected image in which transparency of the target region in a second subject image of a second subject has been corrected to a threshold or more.

15 Claims, 12 Drawing Sheets

(56) References Cited

U.S. PATENT DOCUMENTS

| | | | |
|---|---|---|---|
| 2007/0247474 A1* | 10/2007 | Takemoto | H04N 1/622 |
| | | | 345/589 |
| 2014/0240222 A1 | 8/2014 | Sugita et al. | |
| 2016/0189431 A1 | 6/2016 | Ueda et al. | |
| 2017/0039691 A1* | 2/2017 | Sugioka | G06K 9/4604 |
| 2018/0012386 A1 | 1/2018 | Kemelmaher | |
| 2018/0189938 A1 | 7/2018 | Kuo | |
| 2018/0374242 A1* | 12/2018 | Li | G06T 15/04 |

FOREIGN PATENT DOCUMENTS

| | | | | |
|---|---|---|---|---|
| JP | 2012-048673 | | 3/2012 | |
| JP | 2014-165613 | | 9/2014 | |
| JP | 2016-122411 | | 7/2016 | |
| JP | 2019212106 A | * | 12/2019 | G06T 7/00 |
| WO | WO-2012153661 A1 | * | 11/2012 | G06T 5/002 |

\* cited by examiner

INFORMATION PROCESSING APPARATUS, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2018-138024, filed on Jul. 23, 2018; the entire contents of which are incorporated herein by reference.

FIELD

Embodiments described herein relate generally to an information processing apparatus, an information processing method, and a computer program product.

BACKGROUND

There is a disclosed technology of displaying a virtual image indicating a state of wearing clothing as trial fitting. For example, there is a disclosed technique of reshaping a clothing image in accordance with a body shape estimated by using a depth sensor and superimposing a reshaped clothing image on a subject image to display a combined image.

DETAILED DESCRIPTION

Conventionally, a combined image is generated by obtaining three-dimensional shape information of a person under trial fitting using a depth sensor or the like and performing reshaping and alignment in accordance with the obtained three-dimensional shape information. Therefore, it has been difficult with the conventional method to easily generate a combined image of a subject image.

According to an embodiment, an information processing apparatus includes an extraction unit and a generation unit. The extraction unit uses a learning model of extracting a combining region from a subject image to extract the combining region from a first subject image of a first subject. The generation unit generates a combined image obtained by combining the extracted combining region with the target region of the corrected image in which the transparency of the target region in a second subject image of a second subject has been corrected to a threshold or more.

Hereinafter, one embodiment of an information processing apparatus, an information processing method, and an information processing program will be described in detail with reference to the accompanying drawings.

Figure 1:
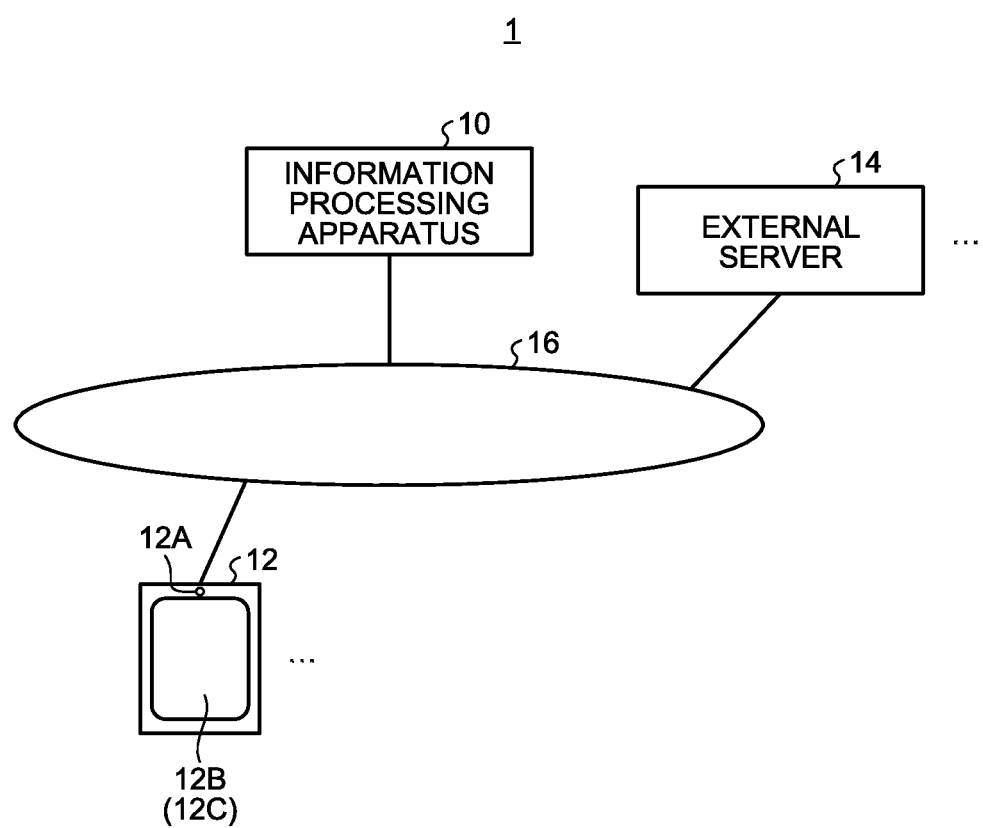
FIG. 1 is a schematic diagram of an information processing system.

FIG. 1 is a schematic diagram of an information processing system 1 according to the present embodiment.

The information processing system 1 includes an information processing apparatus 10, a terminal device 12, and an external server 14. The information processing apparatus 10, the terminal device 12, and the external server 14 are mutually connected via a network 16 to achieve wired or wireless communication.

Note that the present embodiment presents an exemplary case where the information processing system 1 includes one information processing apparatus 10, one external server 14, and one terminal device 12. Alternatively, however, the information processing system 1 may include a plurality of apparatuses, that is, at least one of the information processing apparatus 10, the terminal device 12, or the external server 14.

The information processing apparatus 10 is a device that generates a combined image. Details of the combined image will be described below.

The terminal device 12 is a terminal device operated by a user. Examples of the terminal device 12 include a known portable terminal and a smartphone. In the present embodiment, the terminal device 12 is operated by a first subject.

The first subject is a user who virtually tries another mode.

Virtually trying another mode means to virtually try at least one mode of a hair mode, a pattern such as a tattoo drawn on the skin, or an item. Items are objects that can be worn by users. Examples of item include clothing, accessories, wigs, eyeglasses, and masks. Examples of clothing include jackets, skirts, trousers, shoes, hats, and swimwear.

The user may be an organism or a non-organism. An organism may be, for example, a person. Note that the organism is not limited to a person, but may be an animal other than a person such as a dog or a cat. In addition, the non-organism includes mannequins simulating the shape of the human body and animals, other objects, or the like, but not limited to these. In the present embodiment, the case where the user is a person will be described. Note that a person such as the first subject will be collectively simply referred to as a user.

The terminal device 12 includes an photographing unit 12A, an input unit 12B, and a display unit 12C.

The photographing unit 12A photographs the first subject to obtain a first subject image of the first subject. The first subject image is an example of the subject image. The photographing unit 12A is a known digital camera.

The data format of the first subject image is not limited. For example, the first subject image is an image in which pixel values indicating color, luminance, or the like are defined for each of the pixels. Note that the first subject image is not limited to a bitmap image.

The input unit 12B receives a user's operation instruction. The input unit 12B is a keyboard, a mouse, an input button, or the like.

The display unit 12C displays various images. In the present embodiment, the display unit 12C displays the combined image generated by the information processing apparatus 10. The display unit 12C is a known Liquid Crystal Display (LCD), an organic Electro-Luminescence (organic EL) display, or the like. Note that the input unit 12B and the display unit 12C may be integrally configured. In this case, the input unit 12B and the display unit 12C may be configured as a touch panel.

The external server 14 is a server device that can process big data including a variety of information such as the second subject image used for combining, a hair mode, a pattern such as a tattoo drawn on the skin, an item worn by the second subject, and information related to the item. In the present embodiment, the external server 14 stores the second subject image, information associated with each of the hair mode, tattoo pattern, and items, or the like. The second subject image is a subject image of a second subject different from the first subject. Details of the second subject image will be described below.

In the information processing system 1 of the present embodiment, the information processing apparatus 10 uses the first subject image photographed by the terminal device 12 and the second subject image obtained from the external server 14 or the like to generate a combined image and supplies the generated image to the terminal device 12.

The information processing apparatus 10 will be described in detail.

Figure 2:
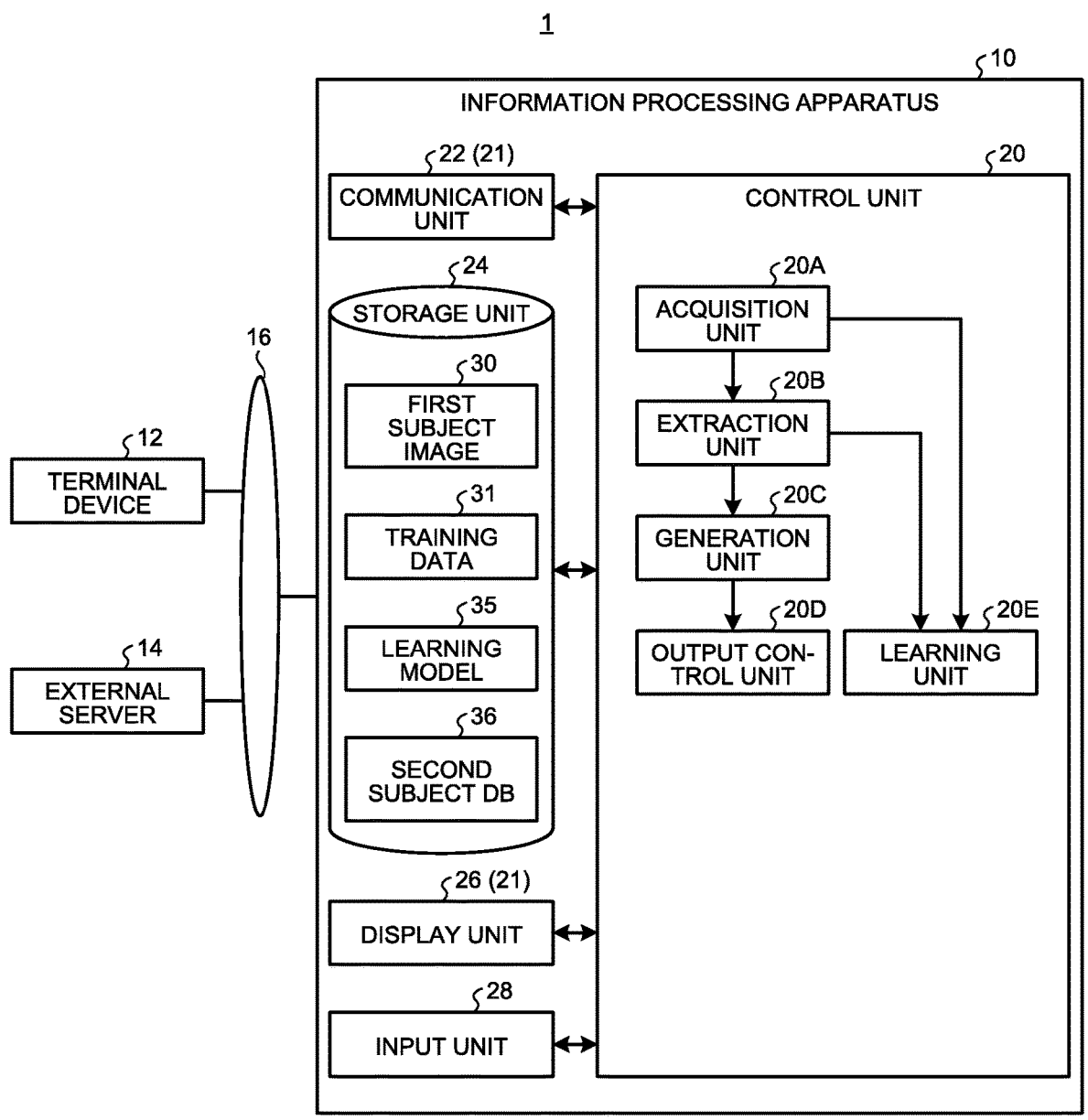
FIG. 2 is a functional block diagram of an information processing apparatus 10.

FIG. 2 is an example of a functional block diagram of the information processing apparatus 10. Note that FIG. 2 also illustrates the terminal device 12 and the external server 14 from the viewpoint of explanation of data input/output.

The information processing apparatus 10 includes a control unit 20, a communication unit 22, a storage unit 24, a display unit 26, and an input unit 28. The communication unit 22, the storage unit 24, the display unit 26, the input unit 28, and the control unit 20 are connected so as to be able to exchange data and signals.

The communication unit 22 is a communication interface for communicating with the terminal device 12 and the external server 14 via the network 16.

The storage unit 24 stores various types of data. In the present embodiment, the storage unit 24 stores a first subject image 30, training data 31, a feature region 33, and a second subject DB 36.

Figure 3A:
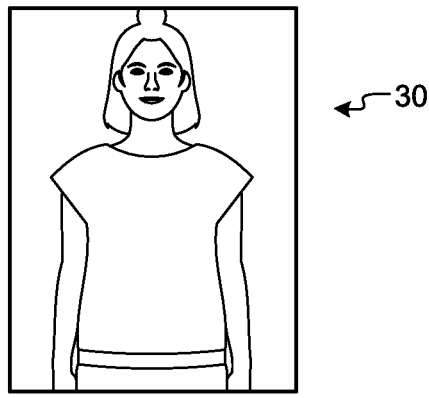
FIG. 3A is a schematic diagram of a first subject image.

FIG. 3A is a schematic diagram illustrating an example of the first subject image 30. The first subject image 30 is a photographed image of the first subject.

Figure 3B:
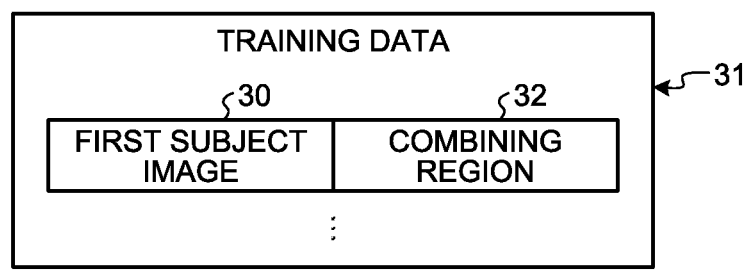
FIG. 3B is a schematic diagram of a data configuration of training data.

FIG. 3B is a schematic diagram illustrating an example of a data configuration of the training data 31. The training data 31 is training data used for learning of a learning model 35. The learning model 35 is a model for extracting a combining region 32 from the subject image. The learning model 35 is learned by the processing of the control unit 20 to be described below by using the training data 31.

The training data 31 is data indicating correspondence between the first subject image 30 and the combining region 32. The combining region 32 is a region, in the first subject image 30, to be combined with a corrected image obtained by correcting the second subject image. Details of the corrected image will be described below.

Figure 3C:
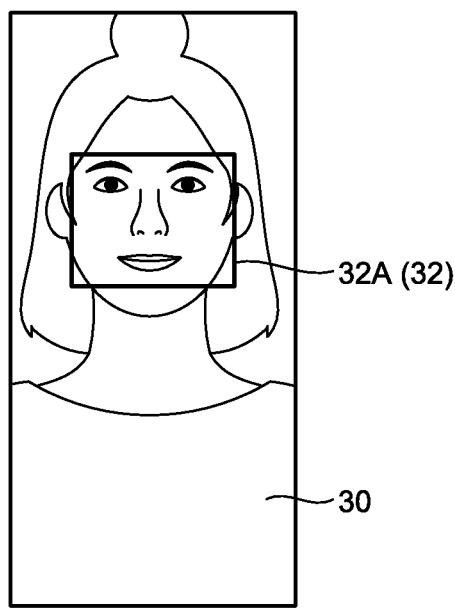
FIG. 3C is a schematic diagram of a combining region.

FIG. 3C is a schematic diagram illustrating an example of the combining region 32. The combining region 32 is, for example, a face region in the first subject image 30. The face region is a region including eyebrows, eyes, nose, and mouth which are parts constituting the face of a person. The face region may be a region including at least eyes, nose, and mouth. Note that the combining region 32 is not limited to the face region.

The storage unit 24 preliminarily stores the first subject image 30, and the combining region 32 extracted from the first subject image 30, as training data 31 in association with each other. The storage unit 24 also stores a plurality of pieces of training data 31. Note that the training data 31 stored in the storage unit 24 may be preliminarily generated by the control unit 20 and stored in the storage unit 24.

For example, the control unit 20 may specify a face region 32A of the first subject image 30 from the first subject image 30 by using a known image processing technique, a face recognition technique, or the like. For example, the face region 32A may be specified as a region including at least eyebrows, nose, cheeks, and lips, and not hidden by the hair in the face of the person. Specifically, the face region 32A may be a rectangular region including a range from the top of the eyebrow to the bottom of the lip and a range from one end of one cheek to the other end of the other cheek.

The control unit 20 may store the correspondence between the first subject image 30 and the face region 32A in the storage unit 24 as the training data 31. Note that the control unit 20 may add new training data 31 or correct the combining region 32 as appropriate by processing described below or the like.

The training data 31 may further include metadata. Examples of metadata include gender and a face angle.

Figure 4A:
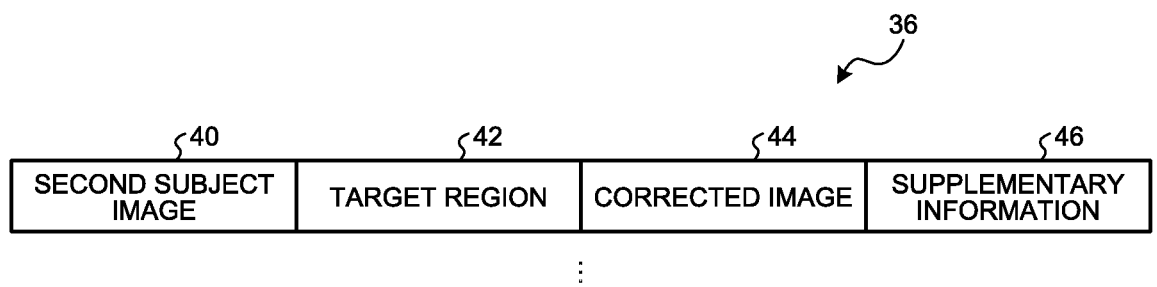
FIG. 4A is a schematic diagram of a data configuration of a second subject DB.

FIG. 4A is a schematic diagram illustrating an example of a data configuration of the second subject DB 36. The second subject DB 36 is a database associating a second subject image 40, a target region 42, a corrected image 44, and supplementary information 46 with each other. Note that it is sufficient as long as the second subject DB 36 is a database associating at least the second subject image 40, the target region 42, and the corrected image 44 with each other, and does not have to include the supplementary information 46. Furthermore, the data format of the second subject DB 36 is not limited to the database.

Figure 4B:
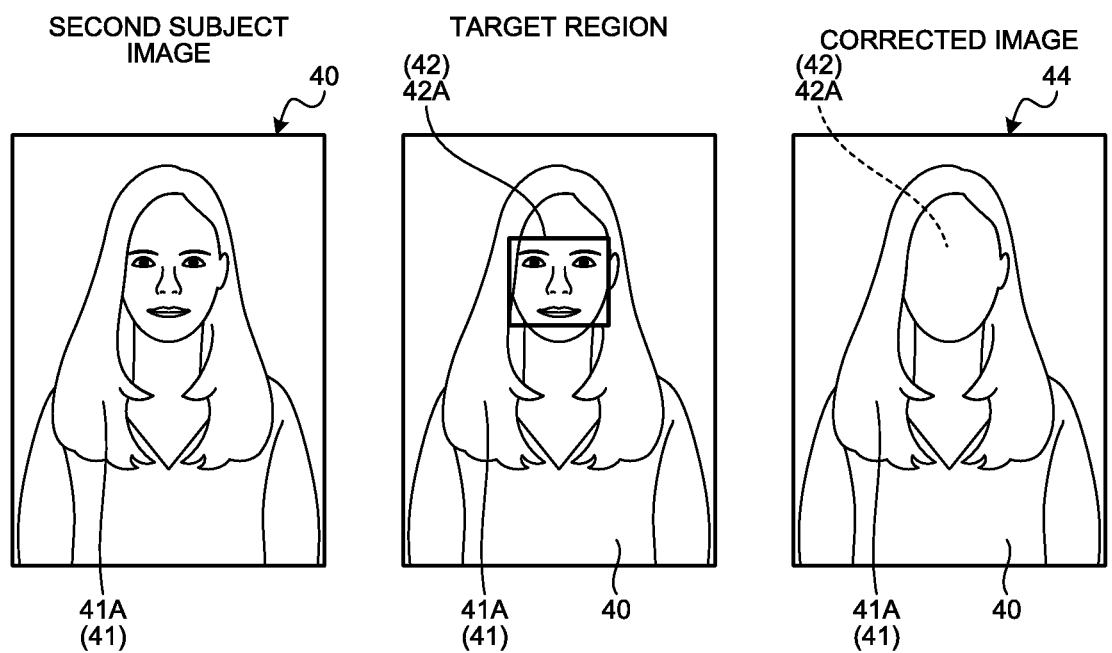
FIG. 4B is a schematic diagram of a second subject image, a target region, and a corrected image.

FIG. 4B is a schematic diagram illustrating an example of the second subject image 40, the target region 42, and the corrected image 44.

The second subject image 40 is a photographed image of the second subject. The second subject is a user different from the first subject. The second subject image 40 is preferably an image including the face and clothing of the second subject. Similarly to the first subject, the second subject may be an organism or a non-organism such as a mannequin. The present embodiment will be described on assumption that the second subject is a person, for example.

In the present embodiment, the second subject image 40 is an image including a trial target site 41 of the first subject.

The trial target site 41 is a site indicating a mode to be virtually tried by the first subject. As described above, the first subject virtually tries another mode, that is, virtually tries at least one mode out of a hair mode, a pattern such as a tattoo drawn on the skin, or an item. The trial target site 41 is a site indicating these virtually tried modes. Specifically, the trial target site 41 is at least one of a hair site, a skin site, or an item worn by the second subject. Items are the similar to the above.

In a case where the trial target site 41 is a hair site, the first subject virtually tries a hairstyle indicated at the hair site of the second subject image 40. In a case where the trial target site 41 is a pattern drawn on the skin, the first subject virtually tries a pattern indicated on the skin site of the second subject image 40. In a case where the trial target site 41 is an item, the first subject virtually tries the item worn by the second subject indicated in the second subject image 40. These virtual trials are implemented by providing a combined image from the control unit 20 described below.

Note that the combining region 32 (refer to FIG. 3C) may be a region adjacent to the trial target site 41 in the first subject image 30. In other words, the combining region 32 may be a region adjacent to the region corresponding to the trial target site 41 of the second subject image 40, in the first subject image 30. That is, in a case where the trial target site 41 is a hair site, the combining region 32 is the face region 32A in the first subject image 30. The face region 32A is a region adjacent to the hair site in the first subject image 30. In addition, in a case where the trial target site 41 is a pattern drawn on the back, the combining region 32 is a region such as an arm, a neck, or a buttock adjacent to the back in the first subject image 30. In addition, in a case where the trial target site 41 is an item such as clothing, the combining region 32 is a region such as an arm or a head adjacent to the clothing in the first subject image 30.

FIGS. 3A to 3C and 4B illustrate an exemplary case where the trial target site 41 is the hair site 41A (41) of the second subject image 40 and the combining region 32 is the face region 32A.

Next, the target region 42 will be described (refer to FIG. 4B). The target region 42 is a region corresponding to the combining region 32 in the second subject image 40. The region corresponding to the combining region 32 indicates a region including the same site as the combining region 32 of the first subject image 30 in the second subject image 40. The site indicates, for example, parts such as eyes, nose, mouth, elbow, or knee, constituting the human body.

For example, in a case where the combining region 32 is the face region 32A, the target region 42 is the face region of the second subject in the second subject image 40. Hereinafter, the target region 42 indicating the face region will be referred to as a target region 42A in some cases. Note that the shapes of the target region 42 and the combining region 32 are not limited. Still, from the viewpoint of ease of alignment at the time of combining, the shapes of the combining region 32 and the target region 42 are preferably rectangular. Furthermore, it is preferable that the target region 42 and the combining region 32 have the same shape. Note that the size of the target region 42 and the size of the combining region 32 may be mutually different. At least a part of the shape of a line indicating an outer edge of each of the target region 42 and the combining region 32 may be mutually different.

Next, the corrected image 44 will be described. The corrected image 44 is an image in which the transparency of the target region 42 in the second subject image 40 of the second subject is corrected to be a threshold or more. It is sufficient as long as this threshold is a value indicating a higher transparency than translucence. That is, the state in which the transparency is a threshold or more means that it is transparent.

For example, in a case where an alpha value indicating transparency is used, that the transparency is a threshold or more means that the alpha value is more toward "0" with respect to an intermediate value "0.5" between "0" indicating complete transparency and "1" indicating complete opacity. The alpha value may be referred to as an alpha channel in some cases. In other words, it is sufficient as long as the alpha value of the target region 42 of the corrected image 44 is lower than the alpha value of the region outside the target region 42, that is, closer to complete transparency than in the outside region.

In this manner, the corrected image 44 is an image in which the transparency of the target region 42 in the second subject image 40 has been corrected to be the threshold or more. That is, the corrected image 44 can be defined as an image of the second subject image 40 from which the target region 42 has been removed. Therefore, in a case where the combining region 32 and the target region 42 are the face region (the face region 32A, the target region 42A), the corrected image 44 can be defined as an image from which the face region of the second subject image 40 has been removed.

Note that the corrected image 44 may also be an image in which the transparency of a boundary region between the inside and the outside of the target region 42 in the second subject image 40 is stepwise or continuously reduced from the inside to the outside of the target region 42. That is, the corrected image 44 may be an image in which the region inside the target region 42 in the second subject image 40 is transparent and correction has been performed such that the transparency of the boundary region corresponding to the outer edge of the target region 42 is stepwise or continuously reduced toward the outside of the target region 42.

By using the corrected image 44 in which the transparency of the boundary region of the target region 42 has been corrected to change stepwise or continuously in this manner, it is possible to suppress the artificiality of the combined image using the corrected image 44.

The corrected image 44 may be created by the control unit 20 and registered beforehand in the second subject DB 36 of the storage unit 24. For example, the control unit 20 adjusts the transparency (for example, alpha value) of the target region 42 of the second subject image 40 to generate the corrected image 44. As described above, it is preferable that the control unit 20 corrects the transparency of the boundary region of the target region 42 to be reduced stepwise from the inside toward the outside. Furthermore, the control unit 20 may display the corrected image 44 on the display unit 26. A user such as an administrator of the information processing apparatus 10 may operate on the input unit 28 while visually checking the corrected image 44 displayed on the display unit 26 so as to perform fine adjustment of the target region 42.

In the present embodiment, it is sufficient as long as the second subject DB 36 may preliminarily register the second subject image 40 of one second subject, and the second subject DB 36 may preliminarily register the second subject image 40 of a plurality of different second subjects. The second subject DB 36 may preliminarily register a plurality of the second subject images 40 in which at least one of the hair site mode, the item being worn, or the pattern drawn on the skin is different for one second subject. The second subject DB 36 may also preliminarily register the plurality of second subject images 40 with different photographing angles for one second subject. Additionally, it is sufficient as long as the target region 42, the corrected image 44, and the supplementary information 46 have been preliminarily registered in the second subject DB 36, in association with each other for each of the second subject images 40.

The supplementary information 46 is information related to the corresponding second subject image 40. Examples of the supplementary information 46 include identification information of the second subject of the second subject image 40, words indicating hairstyle of the hair site of the second subject, information indicating a hairdresser capable of providing the hairstyle, the name of the item worn by the second subject, and the information indicating the shop that can provide the item. An example of identification information of the second subject is a user name of the second subject. These pieces of information may be information indicating a location (Uniform Resource Locator (URL)) on the Internet in which these pieces of information are stored.

At least one of the second subject image 40, the target region 42, the corrected image 44, and the supplementary information 46 may be registered to the second subject DB 36 by storing the information collected from the external server 14 to the storage unit 24 by the control unit 20. In addition, at least one of the target region 42 and the corrected image 44 may be generated by image processing using the second subject image 40 by the control unit 20 and then registered in the second subject DB 36. For this image processing, a known image processing method may be used.

Returning to FIG. 2, description will be continued. The display unit 26 displays various types of information. The display unit 26 is a known Liquid Crystal Display (LCD) and an organic Electro-Luminescence (organic EL) display, for example.

At least one of the display unit 26 or the communication unit 22 functions as an output unit 21. The output unit 21 outputs various types of information. The output unit 21 displays various types of information so as to function as the display unit 26. Furthermore, the output unit 21 transmits various types of information to the terminal device 12 and the external server 14 via the network 16 so as to function as the communication unit 22.

The input unit 28 receives a user's operation instruction. The input unit 28 includes a keyboard, a mouse, and an input button. Note that the display unit 26 and the input unit 28 may be integrally configured. In this case, the display unit 26 and the input unit 28 may be configured as a touch panel.

Next, the control unit 20 will be described.

The control unit 20 controls the information processing apparatus 10. The control unit 20 includes an acquisition unit 20A, an extraction unit 20B, a generation unit 20C, an output control unit 20D, and a learning unit 20E. Part or all of the acquisition unit 20A, the extraction unit 20B, the generation unit 20C, the output control unit 20D, and the learning unit 20E can be implemented by causing a processor such as central processing unit (CPU) to execute a program, that is, implemented by software, may be implemented by hardware such as an integrated circuit (IC), or may be implemented by using software and hardware in combination.

The acquisition unit 20A obtains the first subject image 30 to be combined. For example, the acquisition unit 20A obtains the first subject image 30 photographed by the terminal device 12 from the terminal device 12 via the network 16 and the communication unit 22.

For example, the first subject operates the input unit 12B at the time of a virtual trial or the like to instruct execution of photographing by the photographing unit 12A. When the photographing unit 12A photographs and obtains the first subject image 30, the terminal device 12 transmits the first subject image 30 to the information processing apparatus 10 via the network 16. Note that the terminal device 12 may transmit the first subject image 30 selected by the operation of the input unit 12B by the first subject among the first subject images 30 stored in the storage unit of the terminal device 12, to the information processing apparatus 10.

Note that the photographing angle of the first subject image 30 might not match with the photographed image of the second subject image 40 stored in the information processing apparatus 10 in some cases. In this case, the terminal device 12 may display information indicating re-photographing after the adjustment of the photographing angle on the display unit 12C. The first subject may adjust the angle of the terminal device 12 to adjust the photographing angle of the photographing unit 12A and may instruct the re-execution of photographing. Then, the terminal device 12 may transmit the re-photographed first subject image 30 to the information processing apparatus 10.

The acquisition unit 20A may obtain the first subject image 30 from the terminal device 12 through the processing.

The extraction unit 20B uses the learning model 35 to extract the combining region 32 from the first subject image 30 of the first subject. Specifically, the extraction unit 20B inputs the first subject image 30 obtained by the acquisition unit 20A to the learning model 35 that extracts the combining region 32 from the subject image, thereby extracting the combining region 32 from the first subject image 30.

The learning model 35 is a learning model that defines a subject image such as the first subject image 30 as input data and defines the combining region 32 as output data. In other words, the learning model 35 is an application program for modeling and calculating an input-output relationship between the first subject image 30 and the combining region 32. The learning model 35 may be expressed by a mathematical expression such as a function.

As described above, the combining region 32 is a region adjacent to the trial target site 41 in the first subject image 30, and indicates a different region in accordance with the trial target site 41. Therefore, the storage unit 24 may store the learning model 35 for extracting the combining region 32, which is a region adjacent to the trial target site 41, for each of the trial target sites 41.

In this case, the acquisition unit 20A may obtain information indicating the first subject image 30 and the trial target site 41 from the terminal device 12. The first subject may operate the terminal device 12 to select the trial target site 41 (for example, the hair site 41A). The terminal device 12 may transmit the information indicating the selected trial target site 41 and the first subject image 30 to the information processing apparatus 10. Meanwhile, the extraction unit 20B reads from the storage unit 24 the learning model 35 corresponding to the trial target site 41 obtained from the terminal device 12 via the acquisition unit 20A. The extraction unit 20B may extract the combining region 32 from the first subject image 30 by using the read learning model 35 and the obtained first subject image 30.

The learning model 35 may be learned by the learning unit 20E and stored beforehand in the storage unit 24. In the present embodiment, the learning unit 20E learns the learning model 35 by machine learning using the training data 31. Known methods may be used for machine learning. For example, the learning unit 20E learns the learning model 35 by using deep learning using algorithms such as a convolutional neural network (CNN) and a recurrent neural network (RNN).

In a case where the learning model 35 is learned for each of trial target sites 41, it is sufficient to prepare the training data 31 that registers the combining region 32 adjacent to the trial target site 41, for each of the trial target sites 41. The learning unit 20E may generate the learning model 35 corresponding to each of the trial target sites 41 by machine learning using the training data 31 corresponding to each of the trial target sites 41.

In the present embodiment, a case where the trial target site 41 is the hair site 41A and the combining region 32 is the face region 32A will be described as an example. Accordingly, in the present embodiment, it is assumed that the learning model 35 corresponding to the hair site 41A has been stored in the storage unit 24.

Note that the training data 31 might be updated in some cases by processing to be described below. It is preferable that every time the training data 31 is updated, the learning unit 20E performs machine learning using the updated training data 31 so as to update the learning model 35.

The extraction unit 20B may use the learned learning model 35 to extract the combining region 32 from the first subject image 30 of the first subject.

Note that the extraction unit 20B may resize the first subject image 30 and then input the image to the learning model 35. By resizing the first subject image 30, it is possible to reduce the processing amount.

Note that the extraction unit 20B might fail in extracting the combining region 32 from the first subject image 30. In this case, the extraction unit 20B may obtain the first subject image 30 again from the terminal device 12 via the acquisition unit 20A and extract the combining region 32.

As described above, the training data 31 may include metadata such as gender, angle of face, or the like.

In this case, the learning unit 20E may learn the learning model 35 with the first subject image 30 and the metadata as input data and the combining region 32 as output data. Furthermore, the learning unit 20E may learn the learning model 35 with the first subject image 30 as input data and the combining region 32 and metadata as output data.

In this case, the extraction unit 20B can use the learning model 35 to extract the combining region 32 from the first subject image 30 and metadata. Furthermore, the extraction unit 20B can use the learning model 35 to extract the combining region 32 and metadata from the first subject image 30.

Next, the generation unit 20C will be described. The generation unit 20C combines the combining region 32 extracted from the first subject image 30 obtained by the acquisition unit 20A with the target region 42 of the second subject image 40 to generate a combined image.

FIGS. 5A to 5D are schematic diagrams illustrating an example of generation of a combined image 60.

Figure 5A:
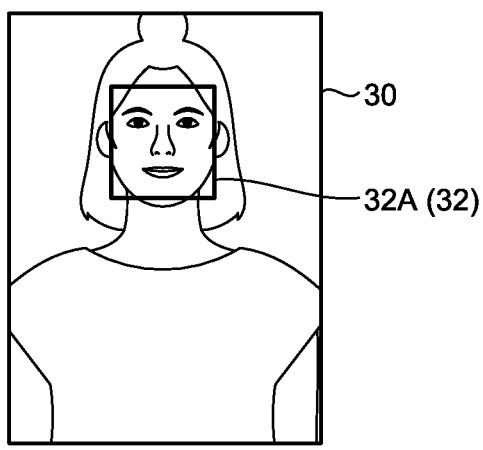
FIG. 5A is a schematic diagram of generation of a combined image.
Figure 5B:
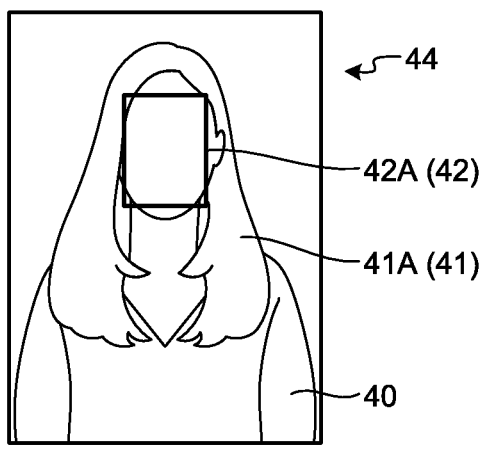
FIG. 5B is a schematic diagram of generation of a combined image.

As illustrated in FIG. 5A, it is assumed that the extraction unit 20B has extracted the face region 32A as the combining region 32 from the first subject image 30.

Subsequently, the generation unit 20C reads the corrected image 44 from the storage unit 24. At this time, the generation unit 20C reads from the storage unit 24 the corrected image 44 in which the transparency of the target region 42 corresponding to the face region 32A has been corrected to a threshold or more. For example, it is assumed that the generation unit 20C has read the corrected image 44 illustrated in FIG. 5B. That is, the generation unit 20C reads the corrected image 44 in which the target region 42A which is the face region is adjusted to be transparent.

Subsequently, the generation unit 20C combines the extracted face region 32A with the target region 42A of the corrected image 44 to generate the combined image 60 (refer to FIG. 5D). That is, the generation unit 20C arranges the face region 32A of the first subject image 30 illustrated in FIG. 5A in the target region 42A (refer to FIG. 5B) being a transparent face region in the corrected image 44 to generate the combined image 60 (refer to FIG. 5D). At this time, the generation unit 20C generates the combined image 60 by adjusting the position of the face region 32A so as to allow the position of the target region 42A and the position of the face region 32A to be aligned with each other.

Note that the face region 32A might protrude from the target region 42A in some cases. In this case, the generation unit 20C may first delete the region in the face region 32A protruding from the target region 42A and then arrange the obtained region in the target region 42A.

As described above, there is a case where an image obtained by correcting the transparency of the boundary region of the target region 42 so as to be stepwise or continuously reduced from the inside to the outside of the target region 42 is used as the corrected image 44. In this case, the generation unit 20C can generate the combined image 60 in which the color tone of the boundary between the corrected image 44 and the face region 32A is continuously changed. With this processing, the generation unit 20C can suppress the artificiality of the combined image 60.

Here, there is a case where at least one of the size and the shape does not match between the target region 42A and the combining region 32.

Figure 5C:
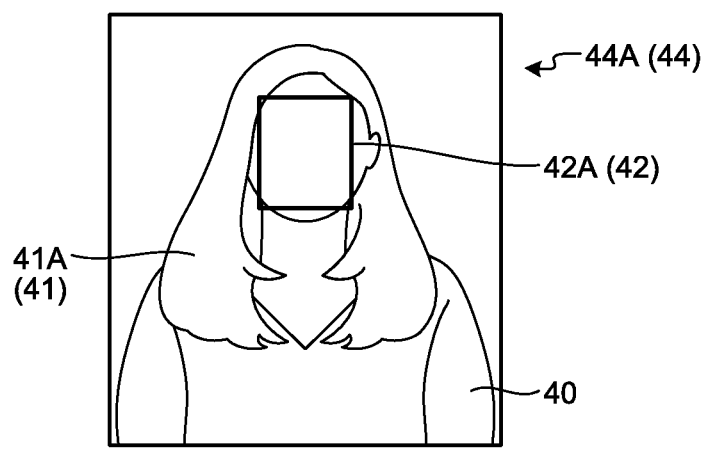
FIG. 5C is a schematic diagram of generation of a combined image.
Figure 5D:
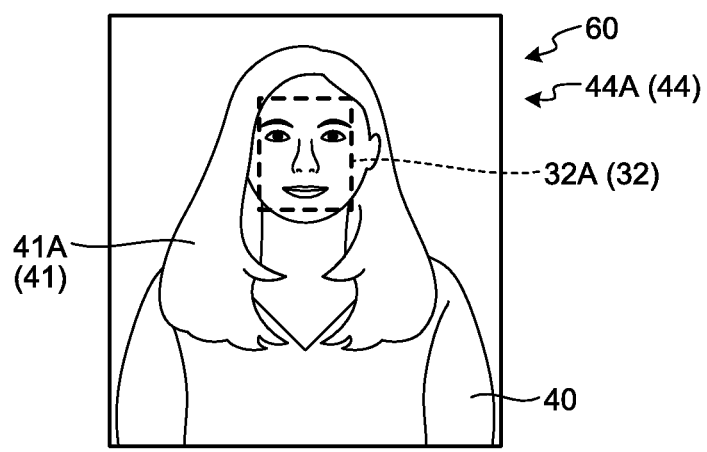
FIG. 5D is a schematic diagram of generation of a combined image.

To handle this situation, as illustrated in FIG. 5C, the generation unit 20C reshapes the entire corrected image 44 so as to achieve agreement in size and shape between the target region 42 and the combining region 32 of the corrected image 44. Subsequently, it is preferable that the generation unit 20C combines the extracted face region 32A with the target region 42A of the reshaped corrected image 44A (44) to generate the combined image 60 (refer to FIG. 5D).

In this manner, the shape and size of the entire corrected image 44 are corrected in accordance with the shape and size of the face region 32A of the first subject image 30. Subsequently, the face region 32A is combined with the corrected corrected image 44. Through this processing, the generation unit 20C can generate the combined image 60 in which the first subject achieves a mode closer to actual trial mode of the trial target site 41 (for example, the hair site 41A) as the trial target.

Note that the greater the difference between the color tone of the combining region 32 in the first subject image 30 and the color tone of the target region 42A in the second subject image 40, the more noticeable the boundary between the combining region 32 and the corrected image 44 in the combined image 60, leading to generation of the combined image 60 with artificiality.

To manage this problem, in the present embodiment, the generation unit 20C corrects the entire color tone of the extracted combining region 32 so as to achieve a difference between the color tone of the feature region in the first subject image 30 and the color tone of the feature region in the second subject image 40 being a predetermined value or less. Next, the generation unit 20C combines the corrected combining region 32 with the target region 42 of the corrected image 44 of the second subject image 40 to generate the combined image 60. The predetermined value may be determined beforehand. Preferably, the predetermined value is "0". That is, the generation unit 20C preferably corrects the color tone of the entire combining region 32 so as to achieve matching between the color tone of the feature region in the first subject image 30 and the color tone of the feature region in the second subject image 40.

FIGS. 6A to 6F are exemplary explanatory diagrams of color tone correction.

Figure 6A:
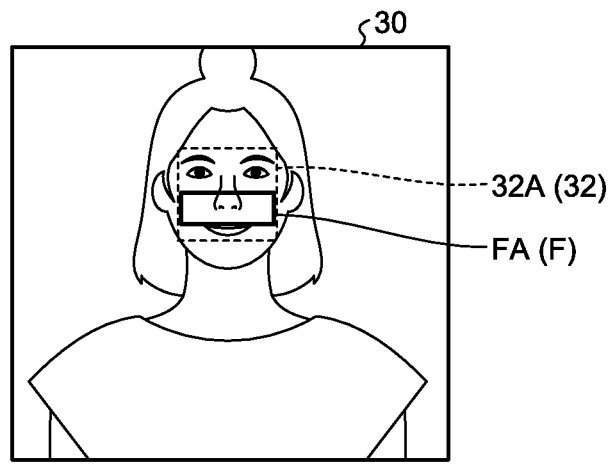
FIG. 6A is an explanatory diagram of color tone correction.

As illustrated in FIG. 6A, a feature region F is a region characteristically expressing the skin color of the subject. The feature region F is a region formed with a plurality of pixels. For example, the feature region F is a region that characteristically expresses the skin color of the first subject image 30 within the combining region 32.

Specifically, the feature region F is a region including at least the brightest region and the darkest region in the combining region 32. Specifically, in a case where the combining region 32 is the face region 32A, the feature region F is a region including a note tip region, a nostril region, and a skin region adjacent to the nose tip region. It is preferable that the skin region is at least one of a region between the user's nose and the lips, or a cheek region.

The nostril region is a region having the lowest brightness in the face region 32A, not likely to vary by factors such as photographing environment and makeup state of the subject. Therefore, it is preferable that the feature region F includes the nostril region. In addition, the region between the nose and the lip and the cheek region is the region with the highest brightness in the face region 32A, not likely to vary by factors such as the photographing environment and the makeup state of the subject. Therefore, it is preferable that the feature region F includes at least one of the region between the nose and the lips, or the cheek region.

Figure 6B:
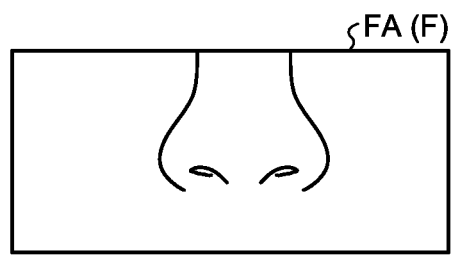
FIG. 6B is an explanatory diagram of color tone correction.
Figure 6C:
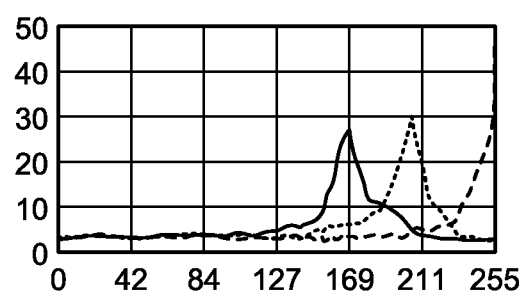
FIG. 6C is an explanatory diagram of color tone correction.

In this case, as illustrated in FIG. 6A, the generation unit 20C extracts a feature region FA as the feature region F in the first subject image 30. As illustrated in FIG. 6B, the feature region FA includes the nose tip region, the nostril region, and the skin region (cheek region, and a region between the nose and the lips). The generation unit 20C analyzes the color tone of the extracted feature region FA. For example, the generation unit 20C assigns a number to each of the pixels from the pixel with the highest luminance or brightness toward the pixel with the lowest luminance or brightness in the feature region FA. The generation unit 20C subsequently analyzes the color tone of each of these pixels. FIG. 6C illustrates a color tone analysis result example of the pixel with the highest brightness in the feature region FA.

Figure 6D:
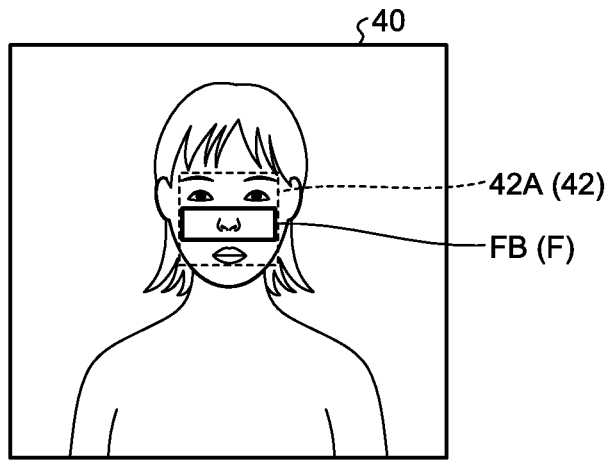
FIG. 6D is an explanatory diagram of color tone correction.
Figure 6E:
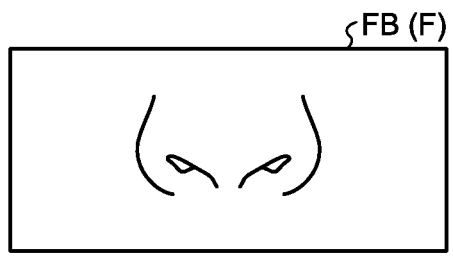
FIG. 6E is an explanatory diagram of color tone correction.
Figure 6F:
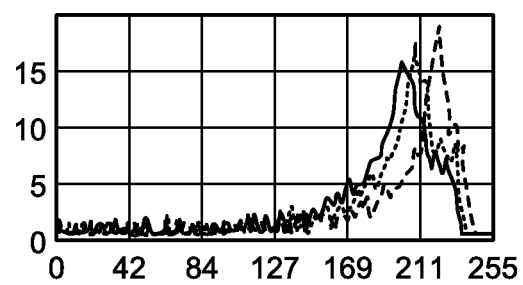
FIG. 6F is an explanatory diagram of color tone correction.

Furthermore, as illustrated in FIG. 6D, the generation unit 20C extracts a feature region FB as the feature region F in the second subject image 40. As illustrated in FIG. 6E, the feature region FB includes the nose tip region, the nostril region, and the skin region (cheek region, and a region between the nose and the lips). The generation unit 20C analyzes the color tone of the extracted feature region FB. For example, the generation unit 20C assigns a number to each of the pixels from the pixel with the highest luminance or brightness to the pixel with the lowest luminance or brightness in the feature region FB. The generation unit 20C subsequently analyzes the color tone of each of these pixels. FIG. 6F illustrates, as an example, a color tone analysis result of the pixel with the highest brightness in the feature region FB.

Subsequently, the generation unit 20C compares the pixels provided with the same number with each other, and derives a correction function for correcting the color tone of the feature region FA of the first subject image 30 such that the difference between the color tone of the feature region FA of the first subject image 30 and the color tone of the feature region FB of the second subject image 40 is a predetermined value or less. The generation unit 20C may then apply the correction function to each of the pixels constituting the combining region 32 of the first subject image 30 to correct the entire color tone of the combining region 32 (the face region 32A).

This correction may use known histogram matching or known tone curve correction.

For example, the generation unit 20C compares the color tone of pixels provided with the same number in each of the feature region FA of the first subject image 30 and the feature region FB of the second subject image 40. Subsequently, the generation unit 20C performs processing of matching the color tone (histogram or tone curve) of the feature region FA of the first subject image 30 with the color tone (histogram or tone curve) of the feature region FB of the second subject image 40. At this time, the generation unit 20C may convert each of the pixels of the feature region FA and the feature region FB into a color space such as a YUV color space and an RGB color space to correct the color tone for each of colors constituting each of the color spaces for pixels provided with the same number.

Next, the generation unit 20C may combine the combining region 32 that has undergone color tone correction with the trial target site 41 of the corrected image 44 to generate the combined image 60.

Figure 7A:
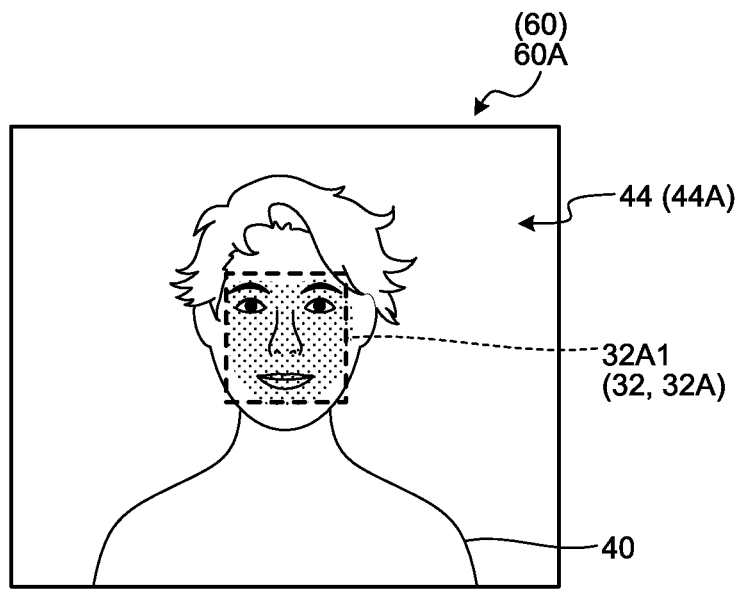
FIG. 7A is an explanatory diagram of combining of a combining region before color tone correction.
Figure 7B:
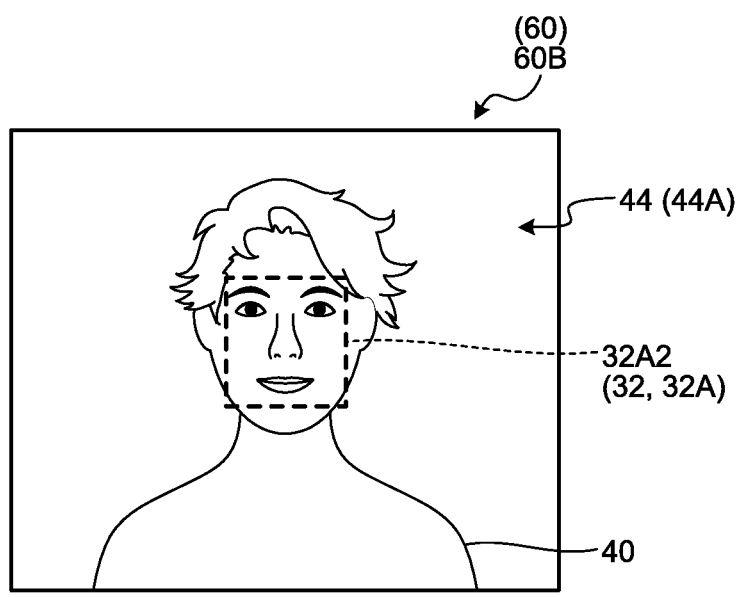
FIG. 7B is an explanatory diagram of combining of the combining region after color tone correction.

FIG. 7A and FIG. 7B are explanatory diagrams of an example of combining of the combining region 32. FIG. 7A is a schematic diagram illustrating an example of the combined image 60A (60) obtained by combining a face region 32A1 with the corrected image 44. The face region 32A1 is an example of the combining region 32 that has not undergone color tone correction. The combined image 60A is an example of the combined image 60 obtained by combining the combining region 32 that has not undergone color tone correction with the corrected image 44. As illustrated in FIG. 7A, the face region 32A1 that has not undergone color tone correction is combined with the corrected image 44. This makes the difference between the color tone of the region other than the hair site 41A in the second subject image 40 being an original image of the corrected image 44 and the color tone of the face region 32A1 of the first subject image 30 to be a predetermined value or more. Accordingly, the combined image 60A might be an image having a large difference in color tone between the face region 32A1 and the region other than the face region 32A1, which generates unnaturalness due to combining.

FIG. 7B is a schematic diagram illustrating an example of the combined image 60B (60) obtained by combining a face region 32A2 with the corrected image 44. The face region 32A2 is an example of the combining region 32 that has undergone color tone correction. The combined image 60B is an example of the combined image 60 obtained by combining the combining region 32 that has undergone color tone correction with the corrected image 44. As illustrated in FIG. 7B, the face region 32A2 being the combining region 32 that has undergone color tone correction is combined with the corrected image 44. This makes the difference between the color tone of the region other than the hair site 41A in the second subject image 40 being an original image of the corrected image 44 and the color tone of the face region 32A2 of the first subject image 30 to be less than a predetermined value. Accordingly, the combined image 60B might be an image having a small difference in color tone between the face region 32A2 and the region other than the face region 32A2, such that the combined image 60 with suppressed unnaturalness due to combining is obtained.

Returning to FIG. 2, description will be continued. The output control unit 20D outputs the combined image 60 generated by the generation unit 20C to the output unit 21. As described above, the output unit 21 includes the communication unit 22 and the display unit 26.

The output control unit 20D displays the combined image 60 on the display unit 26 to output the combined image 60. Furthermore, the output control unit 20D transmits the combined image 60 to the terminal device 12 via the network 16 to output the combined image 60 to the terminal device 12. Furthermore, the output control unit 20D transmits the combined image 60 to the external server 14 via the network 16 to output the combined image 60 to the external server 14.

The output unit 21 may be a digital signage (electronic signboard) connected to the network 16. In this case, the output control unit 20D outputs the combined image 60 to the digital signage.

At this time, the output control unit 20D may output the combined image 60 together with related information related to the second subject image 40 as the correction source of the corrected image 44 used for combining the combined image 60.

The related information is at least one of: affinity between the feature of the first subject and the trial target site 41 of the second subject image 40; user names other than the first subject similar to the combined image 60; characteristic information indicating a characteristic of the combined image 60; or difference information indicating a difference between the first subject and the second subject.

Affinity is a degree of affinity between the feature of the first subject of the first subject image 30 used for combining the combined image 60 and the trial target site 41 of the second subject image 40 being the correction source of the corrected image 44 used for combining the combined image 60.

The feature of the first subject may be a feature of the trial target site 41 in the first subject, or may be a feature other than the trial target site 41. Examples of the feature of the first subject include a facial feature, the hairstyle, and the preference of clothing of the first subject. Hairstyle includes hair length, haircut position, hair quality, etc. The output control unit 20D may use a known image analysis method, a known data analysis method using big data managed by the external server 14, or the like, to specify the features of the first subject.

Affinity is a degree of affinity between the feature of the first subject of the first subject image 30 used for combining the combined image 60 and the trial target site 41 of the second subject image 40 being the correction source of the corrected image 44 used for combining the combined image 60. Specifically, affinity is information indicating the degree of affinity between the feature of the first subject illustrated in the combined image 60 and the hairstyle indicated by the hair site 41A illustrated in the combined image 60. For example, the affinity is represented by an evaluation value obtained by evaluating the subject illustrated in the combined image 60 from a predetermined viewpoint such as fashion sense. Specifically, the affinity is represented by an evaluation value based on a degree of coolness, cuteness, or the like, of the subject illustrated in the combined image 60.

The output control unit 20D may use known machine learning to preliminarily learn the learning model for deriving the affinity from the combination of the feature of the first subject and the trial target site 41 of the second subject image 40. The output control unit 20D may input the feature of the first subject of the first subject image 30 used for combining the combined image 60 and the trial target site 41 of the corrected image 44 (second subject image 40) used for combining the combined image 60 into the learning model to derive the affinity.

The output control unit 20D outputs the affinity together with the combined image 60 to the terminal device 12, making it possible to quantitatively provide to the first subject the affinity between the feature of the first subject such as the hairstyle, preference, and facial features of the first subject, and the trial target site 41 such as the hair mode, patterns drawn on the skin, and items in the corrected image 44 used for combining the combined image 60.

In addition, as a result of outputting, by the output control unit 20D, a plurality of combined images 60 and affinity of each of the plurality of combined images 60, the first subject can visually check the output and objectively confirm the trial target site 41 matching own features such as a hairstyle and preference (hairstyle represented by hair mode, pattern, items such as clothing).

Furthermore, by providing the combined image 60 and the affinity, the output control unit 20D can provide various hairstyles, patterns, and items such as clothing corresponding to the feature of the first subject. This enables the first subject to confirm trial results of various hairstyles, patterns, clothing or the like from an objective point of view. In addition, the output control unit 20D can provide an opportunity to select the trial target site 41 to be actually tested from an objective viewpoint to the first subject.

Alternatively, the output control unit 20D may derive information indicating the trial target site 41 implementable by partially changing the mode of the first subject illustrated in the first subject image 30 in accordance with the feature of the first subject and may output this derived information together with the combined image 60 to the output unit 21. For example, the output control unit 20D may output information indicating another hairstyle implementable by hairdo in accordance with the hair quality of the first subject. In this case, the first subject can objectively confirm the mode of styling of hair after haircut at the stage before the haircut.

As described above, the related information may be a user name other than the first subject similar to the combined image 60.

In this case, the output control unit 20D may use a known method to preliminarily learn a learning model for deriving the user name of the user similar to the combined image 60 from the combined image 60. The output control unit 20D may input the combined image 60 generated by the generation unit 20C to the learning model to derive the user name similar to the combined image 60.

For example, the output control unit 20D outputs the combined image 60 and the user name other than the first subject similar to the combined image 60 to the terminal device 12. This enables the first subject operating the terminal device 12 to visually check the combined image 60 and the user name, and to easily confirm to what types of users the combined image 60 obtained by combining its own combining region 32 with the other second subject image 40 would be similar.

Therefore, in this case, the information processing apparatus 10 can provide an opportunity to objectively analyze own fashion to the first subject. In addition, the information processing apparatus 10 can provide the opportunity to focus on the fashion of the user identified by the output user name, to the first subject.

In addition, as described above, the related information may be characteristic information indicating a characteristic of the combined image 60. It is preferable that the characteristic information is information expressing the characteristic of the combined image 60 in a combination of words of a predetermined number or less. The predetermined number is, for example, five words, three words, two words, or the like, but it is not limited thereto. The characteristic information is, for example, "cool and dandy man", "hot sport style", "cute coordination", but it is not limited to these.

In this case, the output control unit 20D may use a known method to preliminarily learn a learning model for deriving the characteristic information of the combined image 60 from the combined image 60. The output control unit 20D may subsequently input the combined image 60 to the learning model to derive and output the characteristic information of the combined image 60.

As a result of outputting characteristic information of the combined image 60 together with the combined image 60 by the output control unit 20D, the first subject can easily grasp an image to be obtained in a case where the trial target site 41 such as an item illustrated in the combined image 60 is tried. In addition, in a case where the trial target site 41 is a hair site, it is possible to provide, to both the first subject and the hairdresser who does the haircut on the first subject, information that can give an image after trial and can be shared by them.

Furthermore, as described above, the related information may be difference information indicating a difference between the first subject and the second subject. More specifically, the related information may be difference information indicating the difference between the first subject in the first subject image 30 used for combining the combined image 60 and the second subject in the second subject image 40 being the correction source of the corrected image 44 used for combining the combined image 60. Specifically, the difference information is a difference in physical features such as physique, age, or the like, of the first subject and the second subject. Physique is represented by physical measurements such as height, weight, and chest.

In this case, the output control unit 20D obtains the physical features such as the physique and age of the first subject from the terminal device 12 or the external server 14. The output control unit 20D may perform image analysis of the first subject image 30 with a known method to obtain the physical features of the first subject. The output control unit 20D further obtains physical features of the second subject from the external server 14. The output control unit 20D may perform image analysis of the second subject image 40 with a known method to obtain the physical features of the second subject.

The output control unit 20D may calculate the difference between the physical feature of the first subject and the physical feature of the second subject to derive the difference information.

In this case, the output control unit 20D outputs the difference information together with the combined image 60 to the terminal device 12.

This enables the first subject operating the terminal device 12 to visually check the combined image 60 and the difference information, and to easily confirm the difference in physical features between the second subject in the second subject image 40 being the correction source of the corrected image 44 indicated in the combined image 60 and oneself (the first subject). The combined image 60 is assumed to be a target figure of the first subject. In this case, the output control unit 20D is capable of easily providing a hairstyle and clothing that can be tried by bringing the physical features such as body weight closer to the second subject of the second subject image 40 indicated in the combined image 60, and images to be obtained as a result of this trial. In addition, the output control unit 20D outputs the combined image 60 and the difference information to the terminal device 12, thereby easily providing information for supporting lift-up of motivation for improving lifestyle such as going on a diet, to the first subject.

Note that the related information may include information indicating guidance to an electronic commerce (e-commerce) website.

In this case, the output control unit 20D specifies the information indicating the guidance to the e-commerce website that can provide the trial target site 41 such as the item included in the corrected image 44 used for generating the combined image 60. For example, the output control unit 20D reads the supplementary information 46 corresponding to the corrected image 44 from the second subject DB 36 (refer to FIG. 4A) to specify the information indicating the guidance to the e-commerce website. The output control unit 20D may output information indicating the guidance to the e-commerce website, together with the combined image 60, to the terminal device 12.

The information indicating the guidance to the e-commerce website may be represented by, for example, a two-dimensional barcode or a three-dimensional barcode.

The output control unit 20D outputs the combined image 60 and information indicating the guidance to the e-commerce website, making it possible to provide information for easily guiding to the e-commerce website from the combined image 60. Furthermore, the acquisition unit 20A may obtain from the terminal device 12 information indicating that information for guiding to the e-commerce website has been selected by the first subject. With the information obtained from the terminal device 12, the control unit 20 can specify user satisfaction questionnaire results for the combined image 60 and the conversion rate to the e-commerce website.

The generation unit 20C may create a plurality of the combined images 60 from one first subject image 30. Specifically, the generation unit 20C may combine the combining region 32 of the first subject image 30 with each of the plurality of corrected images 44 stored in the second subject DB 36 of the storage unit 24. In this case, the generation unit 20C combines the combining region 32 of one first subject image 30 with each of the plurality of corrected images 44 to generate the plurality of combined images 60.

In this case, the output control unit 20D may output all or part of the plurality of combined images 60 generated by the generation unit 20C.

For example, the output control unit 20D calculates a confidence factor indicating whether each of the plurality of combined images 60 is a natural combining result. The confidence factor is a value indicating whether a combining of the corrected image 44 and the combining region 32 in the combined image 60 has produced a natural combining result. This indicate that the higher the confidence factor, the more natural the combining result.

The output control unit 20D may preliminarily learn a learning model for deriving the confidence factor. For learning of this learning model, a known method may be used. For example, to learn this learning model, it is allowable to use training data indicating correspondence between the combined image 60 generated in the past by the control unit 20 and the confidence factor for the combined image 60.

The confidence factor indicated in the training data may be defined by a plurality of parameters concerning the corresponding combined image 60, such as the user satisfaction questionnaire result, the conversion rate to the e-commerce website, the repeat rate, and whether the combined image 60 has been saved in the terminal device 12.

The user satisfaction questionnaire result is information indicating the degree of satisfaction of the first subject with the combined image 60. For example, the first subject who has visually checked the combined image 60 using the terminal device 12 operates the input unit 12B to input the degree of satisfaction with the combined image 60. The information indicating the degree of satisfaction may be transmitted from the terminal device 12 to the information processing apparatus 10 as a result of the user satisfaction questionnaire.

The conversion rate to the e-commerce website is calculated by expressed by the rate of access made to the supplementary information 46 (FIG. 4A) corresponding to the corrected image 44 used for combining the combined image 60 in the form of operation input by the first subject onto the input unit 12B after the combined image 60 is displayed on the terminal device 12. The repeat rate is represented by the number of times of access to the supplementary information 46.

The conversion rate, the repeat rate, and information indicating whether the combined image 60 is stored in the terminal device 12 are assumed to be transmitted from the terminal device 12 to the information processing apparatus 10.

The output control unit 20D of the information processing apparatus 10 may use one or a plurality of pieces of training data indicating correspondence between these confidence factors and the combined image 60 corresponding to the confidence factor to learn the learning model. The output control unit 20D may next input the combined image 60 generated by the generation unit 20C to this learning model to derive the confidence factor of the combined image 60.

The output control unit 20D may then select the combined image 60 whose confidence factor is a threshold or more, as an output target. This threshold may be determined beforehand.

Note that regarding the combined image 60 excluded from the output target, the output control unit 20D may transmit retransmission request of re-photographing and retransmission of the first subject image 30 to the first subject of the first subject image 30 used for combining the combined image 60. In this case, the output control unit 20D may transmit the retransmission request to the terminal device 12 operated by the first subject, via the communication unit 22 and the network 16.

After receiving the retransmission request, the terminal device 12 displays on the display unit 12C information indicating a photographing request for photographing with the photographing angle changed. The first subject adjusts the angle of the terminal device 12 to adjust the photographing angle of the photographing unit 12A, while operating the input unit 12B to instruct execution of photographing by the photographing unit 12A. When the photographing unit 12A photographs and obtains a new first subject image 30, the terminal device 12 may transmit the first subject image 30 to the information processing apparatus 10 via the network 16. The control unit 20 of the information processing apparatus 10 may generate the combined image 60 in a similar manner to the above description by using the newly obtained first subject image 30.

Note that the terminal device 12 that received the retransmission request may display the first subject image 30 and the combining region 32 used for generating the combined image 60 excluded from the output target, on the display unit 12C. In this case, the output control unit 20D of the information processing apparatus 10 may transmit the first subject image 30 and the combining region 32 used for generation of the combined image 60 excluded from the output target, together with the retransmission request, to the terminal device 12.

Meanwhile, the first subject operating the terminal device 12 operates the input unit 12B of the terminal device 12 to adjust at least one of the position or the shape of the displayed combining region 32. The terminal device 12 may transmit the adjusted combining region 32 and the first subject image 30 to the information processing apparatus 10. The generation unit 20C of the information processing apparatus 10 may use the first subject image 30 and the combining region 32 received from the terminal device 12 to generate the combined image 60 similarly to the above description.

In this manner, the generation unit 20C generates the combined image 60 by using the combining region 32 in which at least one of the position and the shape has been adjusted by the first subject, making it possible to correct an extraction error of the combining region 32 by the extraction unit 20B.

In this case, the generation unit 20C may register the first subject image 30 and the combining region 32 received from the terminal device 12 as the new training data 31 in the storage unit 24. Additionally, every time the training data 31 in the storage unit 24 is updated, the learning unit 20E may use the training data 31 to newly generate the learning model 35. With this processing, it is possible to improve the accuracy of the learning model 35.

Note that the generation unit 20C may again execute adjustment of the combining position and adjustment of the color tone for the combined image 60 excluded from the output target similarly to the above description so as to generate the combined image 60 again. As for the combined image 60 excluded from the output target, the generation unit 20C may correct the shape of the first subject image 30 used for generating the combined image 60 so as to become a subject image photographed from a different photographing direction (for example, from the side closer to the head or from the side closer to the foot). This correction is, for example, trapezoidal correction or the like. The generation unit 20C may next use the first subject image 30 that has undergone trapezoidal correction to generate the combined image 60 again similarly to the above description.

Note that the output control unit 20D may further output the combined image 60 selected on the basis of the related information added to the combined image 60 to the output unit 21.

For example, the output control unit 20D may select the combined image 60 corresponding to the related information that satisfies at least one of: affinity being a predetermined value or more; preset user name; preset characteristic information; or preset difference information, as an output target. The generation unit 20C may next output the selected combined image 60 to the output unit 21.

As described above, the confidence factor of the combined image 60 is defined by a plurality of parameters concerning the combined image 60, such as the user satisfaction questionnaire result, the conversion rate to electronic commerce (e-commerce) websites, the repeat rate, and whether the combined image 60 has been saved in the terminal device 12.

As described above, these parameters are input by the first subject operating the terminal device 12 displaying the combined image 60.

The operation of the input unit 12B performed by the first subject after visually checking the displayed combined image 60 is very valuable data. That is, information represented by the parameters described above, such as the user satisfaction questionnaire result for the combined image 60, the conversion rate to the e-commerce website, the repeat rate, and whether the combined image 60 has been saved in the terminal device 12, can be utilized as information indicating handling of the provided combined image 60 by the first subject.

Therefore, for example, the learning unit 20E prepares training data indicating the correspondence between the features of the first subject of the first subject image 30 and the above-described parameters for the combined image 60 generated by using the first subject image 30. Every time the training data is updated, the learning unit 20E uses known machine learning to learn and update a learning model for deriving the above parameters from the features of the first subject. The learning unit 20E may then store this learning model in the storage unit 24 or transmit it to the external server 14.

With such a learning model provided, it is possible to provide information (learning model) that can easily derive the trial target site 41 (the hair site 41A, the skin pattern, or the item) used in the combining of an on-trend combined image 60.

In addition, analysis of this learning model makes it possible to easily specify what trial target site 41 has been tried on the first subject of what types of features. Specifically, it is possible to easily specify what type of hairstyle or clothing has been suitably tried onto the first subject of what type of feature.

Furthermore, the output control unit 20D may represent a feature amount of the trial target site 41 with a plurality of parameters by a known method. The output control unit 20D then estimates the directivity (vector) of the feature amount of the trial target site 41 from a time series group of the differences between these parameters. The output control unit 20D may next transmit the information indicating the directivity of the estimated feature amount to the external server 14 or the like. With the series of processing, the output control unit 20D can easily provide information applicable to estimate items, hairstyles, patterns, or the like, that are likely to be on trend in the future.

Next, a procedure of information processing executed by the information processing apparatus 10 will be described.

Figure 8:
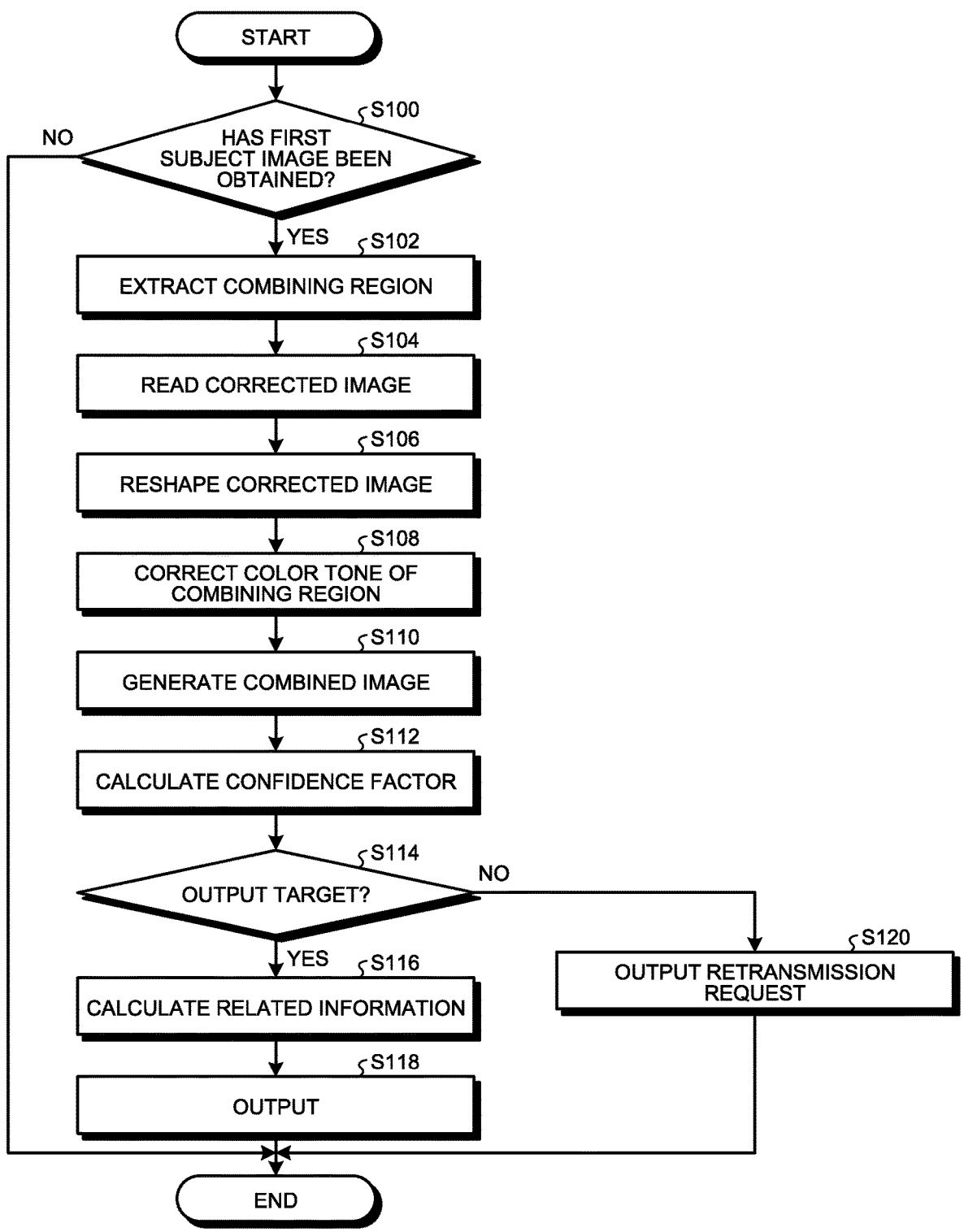
FIG. 8 is a flowchart of information processing procedure.

FIG. 8 is a flowchart illustrating an example of a procedure of information processing executed by the information processing apparatus 10.

First, the acquisition unit 20A determines whether the first subject image 30 has been obtained from the terminal device 12 (step S100). When a negative determination is made in step S100 (step S100: No), the routine is terminated. When an affirmative determination is made in step S100 (step S100: Yes), the processing proceeds to step S102.

Next, the extraction unit 20B uses the first subject image 30 obtained in step S100 and the learning model 35 to extract the combining region 32 from the first subject image 30 (step S102).

Next, the generation unit 20C reads the corrected image 44 to be combined into the combining region 32 from the second subject DB 36 (step S104). Next, the generation unit 20C reshapes the entire corrected image 44 so that the target region 42 of the corrected image 44 read in step S104 matches the combining region 32 extracted in step S102 (step S106).

Next, the generation unit 20C corrects the color tone of the entire combining region 32 extracted in step S102 such that the difference between the color tone of the feature region FA in the first subject image 30 obtained in step S100 and the color tone of the feature region FB in the second subject image 40 being the correction source of the corrected image 44 read in step S104 is a predetermined value or less (step S108).

Next, the generation unit 20C combines the combining region 32 that has undergone color tone correction in step S108 with the target region 42 of the corrected image 44 reshaped in step S106 to generate the combined image 60 (step S110).

The generation unit 20C uses the corrected images 44 of each of the plurality of second subject images 40 registered in the second subject DB 36 to execute the processing in steps S104 to S110, thereby generating a plurality of combined images 60.

Next, the output control unit 20D calculates a confidence factor indicating whether each of the generated plurality of combined images 60 is a natural combining result (step S112).

Next, the output control unit 20D selects the combined image 60 whose confidence factor calculated in step S112 is a threshold or more among the plurality of combined images 60 as an output target, while outputting the combined image 60 whose confidence factor is less than the threshold as an image excluded from the output target (step S114).

As for the combined image 60 selected as the output target in step S114 (step S114: Yes), the output control unit 20D derives the related information related to the second subject image 40 being the correction source of the corrected image 44 used for combining the combined image 60 (step S116).

Subsequently, the output control unit 20D outputs the combined image 60 and the related information to the terminal device 12 for each of the one or more combined images 60 selected as an output target in step S114 (step S118). This routine is then terminated.

Meanwhile, as for the combined image 60 selected as being excluded from the output target in step S114 (step S114: No), the output control unit 20D outputs a retransmission request indicating re-photographing and retransmission of the first subject image 30 to the terminal device 12 (Step S120). This routine is then terminated.

As described above, the information processing apparatus 10 of the present embodiment includes the extraction unit 20B and the generation unit 20C. The extraction unit 20B uses the learning model 35 that extracts the combining region 32 from the subject image to extract the combining region 32 from the first subject image 30 of the first subject. The generation unit 20C generates the combined image 60 obtained by combining the extracted combining region 32 with the target region 42 of the corrected image 44 in which the transparency of the target region 42 in the second subject image 40 has been corrected to a threshold or more.

In this manner, the information processing apparatus 10 of the present embodiment uses the learning model 35 to extract the combining region 32 from the first subject image 30. Therefore, the information processing apparatus 10 of the present embodiment makes it possible to easily extract the combining region 32 used at the time of combining without acquisition of information related to the three-dimensional shape of a person under trial fitting using a depth sensor or the like.

Furthermore, the information processing apparatus 10 according to the present embodiment combines the combining region 32 extracted from the first subject image 30 of the first subject, which is a target of various types of trials, with the target region 42. That is, the information processing apparatus 10 according to the present embodiment combines the combining region 32 extracted from the first subject image 30 with the target region 42 of the corrected image 44 generated by adjusting the target region 42 of the second subject image 40 to be transparent. With this processing, the information processing apparatus 10 of the present embodiment can easily generate the combined image 60 illustrating the state in which the first subject is virtually trying another mode.

Consequently, the information processing apparatus 10 of the present embodiment can easily generate a combined image of subject images (the first subject image 30 and the second subject image 40).

Furthermore, since the information processing apparatus 10 according to the present embodiment uses the first subject image 30 extracted from the first subject image 30 obtained from the terminal device 12 for combining, it is possible to suppress setting restrictions on the first subject image 30 used for the combining. That is, the information processing apparatus 10 according to the present embodiment can use the desired first subject image 30 of the first subject to generate the combined image 60.

Furthermore, the information processing apparatus 10 according to the present embodiment combines the combining region 32 extracted from the first subject image 30 with the target region 42 of the corrected image 44 to generate the combined image 60.

Therefore, the information processing apparatus 10 according to the present embodiment can reduce the amount of image processing, as compared with the conventional technologies in which the combined image 60 is generated using three-dimensional shape data obtained by a depth sensor, or the like. Accordingly, the information processing apparatus 10 of the present embodiment can reduce the generation time of the combined image 60. That is, the information processing apparatus 10 can provide the first subject with an environment capable of real-time trials.

The information processing apparatus 10 according to the present embodiment combines the combining region 32 extracted from the first subject image 30 with the transparent target region 42 of the corrected image 44 to generate the combined image 60. Accordingly, the information processing apparatus 10 does not need to perform strict alignment when combining the corrected image 44 and the combining region 32. That is, the information processing apparatus 10 of the present embodiment can easily provide the combined image 60 with reduced artificiality with a simple configuration.

Furthermore, in the information processing apparatus 10 of the present embodiment, the control unit 20 adjusts the transparency (for example, alpha value) of the target region 42 of the second subject image 40 to generate the corrected image 44.

That is, the control unit 20 can generate the corrected image 44 simply by adjusting the alpha value for the plurality of second subject images 40 managed by the external server 14 or the like. Therefore, the control unit 20 can easily generate the corrected image 44 of the various trial target sites 41 for each of the plurality of second subject images 40. That is, the control unit 20 can easily generate a large amount of corrected image 44 at low load.

Alternatively, the output control unit 20D may correct the corrected image 44 used for combining the combined image 60, for the combined image 60 having a confidence factor indicating whether it is a natural combining result being a threshold or less.

For example, it is assumed that the trial target site 41 in the second subject image 40 is clothing having delicate materials and shapes. Clothing of delicate material is, for example, clothing of special materials such as lace material. Clothing having a delicate shape is, for example, clothing having a special shape such as a wedding dress.

In this case, regarding the target region 42 adjacent to the trial target site 41, it is necessary to finely adjust the shape of the target region 42, particularly the shape of the boundary with the trial target site 41 such as the hair site 41A. In this case, the control unit 20 displays on the display unit 26 the corrected image 44 in which the transparency of the target region 42 of the second subject image 40 has been corrected to be a threshold or more. A user such as an administrator of the information processing apparatus 10 operates on the input unit 28 while visually checking the corrected image 44 displayed on the display unit 26 so as to perform fine adjustment of the target region 42.

This processing enables the information processing apparatus 10 to generate the high-quality corrected image 44 and store it in the storage unit 24. Furthermore, with a capability of generating the combined image 60 using such a corrected image 44, the information processing apparatus 10 can provide the high-quality combined image 60.

First Modification

As described above, it is sufficient as long as the combining region 32 (refer to FIG. 3C) of the first subject image 30 is a region adjacent to the trial target site 41 (refer to FIG. 4B) of the second subject image 40 in the first subject image 30.

That is, as described above, in a case where the trial target site 41 is the hair site 41A, the combining region 32 is the face region 32A in the first subject image 30.

The combining region 32, however, is only required to be a region adjacent to the trial target site 41, and is not limited to the face region 32A.

Figure 9A:
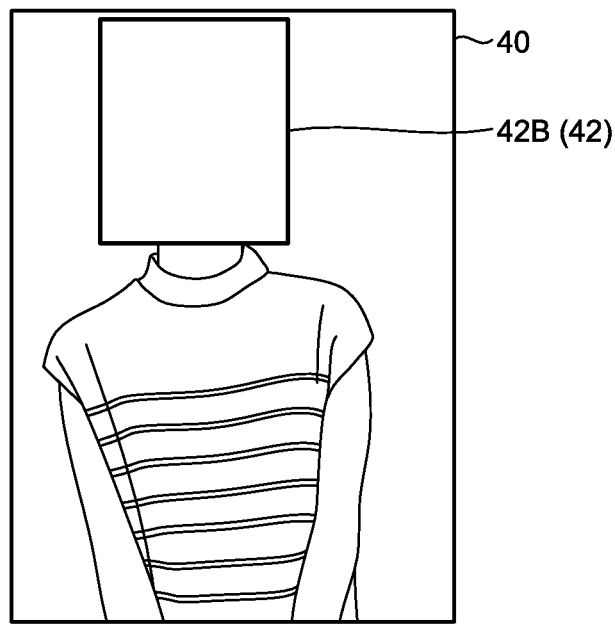
FIG. 9A is a schematic diagram of a trial target site.
Figure 9B:
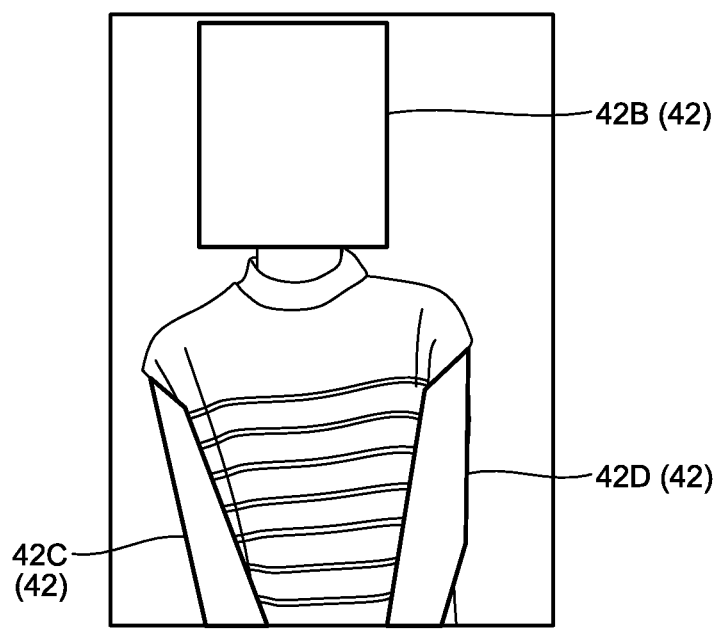
FIG. 9B is a schematic diagram of a trial target site.

FIGS. 9A and 9B are schematic diagrams illustrating an example of the trial target site 41 other than the hair site 41A.

FIG. 9A is an explanatory diagram in a case where the trial target site 41 is a site other than the head portion of the second subject (site closer to the foot side than the head portion). In a case where the trial target site 41 is a site other than the head portion of the second subject, the target region 42 corresponding to the combining region 32 is a region 42B indicating the head portion of the second subject in the second subject image 40. In this case, the combining region 32 of the first subject image 30 is the head region of the first subject.

FIG. 9B is an explanatory diagram in a case where the trial target site 41 is the clothing worn by the second subject. In a case where the trial target site 41 is the clothing of the second subject, the target region 42 is a region other than the clothing region of the clothing in the second subject image 40 (region 42B, region 42C, and region 42D). In this case, the combining region 32 of the first subject image 30 is a region, in the first subject, corresponding to the region 42B, the region 42C, and the region 42D.

In the present modification, the control unit 20 may preliminarily generate the corrected image 44 in which the transparency of the trial target site 41 in the second subject image 40 is corrected to be a threshold or more, and store the corrected image 44 in the storage unit 24 beforehand.

The generation unit 20C may generate the combined image 60 similarly to the above embodiment.

In this manner, with preliminarily preparation of the corrected image 44 corresponding to the trial target site 41 in the second subject image 40 and combining the combining region 32 of the first subject image 30 with the trial target site 41 of the corrected image 44, it is possible to generate the combined image 60 similarly to the above embodiment.

Accordingly, with adjustment of the trial target site 41, the information processing apparatus 10 can easily generate not only the combined image 60 in which the face region 32A of the first subject image 30 is combined with the face region of the second subject image 40, but also the combined image 60 in which the corresponding combining region 32 of the first subject image 30 is combined with an arbitrary site (clothing portion, upper body portion, or the like) of the second subject image 40.

For example, it is assumed that the trial target site 41 is the hair site 41A and the first subject carrying the terminal device 12 visually checks the combined image 60 in a hairdresser. In this case, by visually checking the combined image 60 displayed on the terminal device 12, the first subject can visually check the combined image 60 in which the first subject has tried various hairstyles. In addition, the first subject can present the displayed combined image 60 to a haircut stylist so as to share the combined image 60 with a haircut stylist. The first subject may operate the terminal device 12 during the wait time in a hairdresser or the like, photograph a plurality of first subject images 30 including face regions with different degrees of revealing with respect to the hair and items, and may transmit the plurality of first subject images 30 from the terminal device 12 to the information processing apparatus 10. The terminal device 12 receives the combined image 60 using each of the plurality of first subject images 30 from the information processing apparatus 10 and displays the image on the display unit 12C. By visually checking the plurality of combined images 60 displayed on the display unit 12C, the first subject can confirm the combined image 60 with which the combining region 32 is properly combined.

Further, for example, in a case where the trial target site 41 is a part other than the head portion of the second subject (a part closer to the foot side than the head portion), the generation unit 20C can combine the combining region 32 being the head region of the first subject image 30 with the target region 42B of the second subject image 40 (refer to FIG. 9A).

In other words, in this case, the generation unit 20C generates a combined image 60 in which the head portion of the second subject image 40 has been replaced with the head portion of the first subject image 30.

Therefore, by visually checking the combined image 60, the first subject can confirm the combined image 60 in which both the hairstyle and the clothing of the second subject image 40 are tried.

Furthermore, for example, it is assumed that the trial target site 41 is the clothing worn by the second subject. In this case, the generation unit 20C can generate the combined image 60 in which the first subject of the first subject image 30 tries the clothing on.

Moreover, it is assumed that the trial target site 41 is the clothing worn by the second subject, and the combining region 32 and the target region 42 are entire regions of the first subject image 30 and the second subject image 40 other than the trial target site 41. In this case, the generation unit 20C can execute the generation processing to generate the combined image 60 in which the clothing of the second subject image 40 is superimposed on the first subject image 30.

Second Modification

At least a part of the information stored in the storage unit 24 in the information processing apparatus 10 according to the above embodiment may be stored in the external server 14. Furthermore, the learning unit 20E in the information processing apparatus 10 may be configured to be included in the external server 14. Furthermore, at least a part of the functions of the information processing apparatus 10 may be implemented on the terminal device 12. In a case where the functions of the information processing apparatus 10 are implemented on the terminal device 12, it is preferable, as the terminal device 12, to use a terminal device having a graphics processing unit (GPU) from the viewpoint of processing speed improvement.

Third Modification

An information processing program executed by the information processing apparatus 10 of the present embodiment may be provided as an application used in a Web server or a management server of a social network service (SNS). In this case, the user such as the first subject can use the application via the terminal device 12 to visually check various combined images easily. Furthermore, in this case, the combined image 60 can be provided as an avatar image being another self image representing the first subject. Therefore, the information processing program of the present embodiment can easily provide information that can be used for advertisements such as items illustrated in the combined image 60 and various campaigns.

Applicability

Applicability of the information processing system 1 of the present embodiment is not limited. For example, the information processing system 1 is applicable to various devices installed in an area that provides services related to the trial target site 41 (hair site 41A, skin site, and an item). For example, the information processing system 1 is applicable to a system installed in a hairdressing room, an apparel industry, an entertainment facility, an event facility, or the like.

Hardware Configuration

Figure 10:
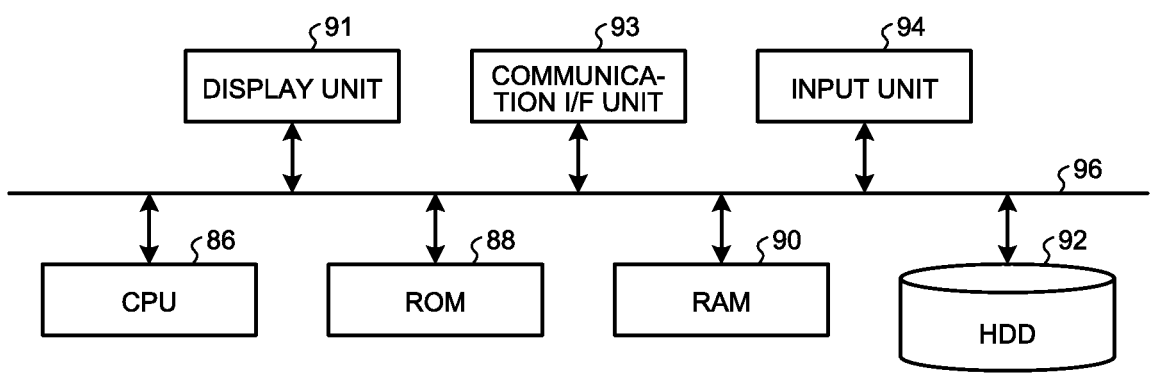
FIG. 10 is a block diagram illustrating a hardware configuration example.

Next, a hardware configuration of the information processing apparatus 10, the terminal device 12, and the external server 14 according to the present embodiment and the modifications will be described. FIG. 10 is a block diagram illustrating a hardware configuration example of the information processing apparatus 10, the terminal device 12, and the external server 14 according to the present embodiment and the modifications.

The information processing apparatus 10, the terminal device 12, and the external server 14 according to the present embodiment and the modifications include a display unit 91, a communication I/F unit 93, an input unit 94, a CPU 86, a read only memory (ROM) 88, a random access memory (RAM) 90, and an HDD 92, which are mutually connected via a bus 96, and has a hardware configuration using a normal computer.

The CPU 86 is an arithmetic device that controls processing of each of the information processing apparatus 10, the terminal device 12, and the external server 14 according to the present embodiment and the modifications. The RAM 90 stores data necessary for various types of processing executed by the CPU 86. The ROM 88 stores programs or the like that implements various types of processing executed by the CPU 86. The HDD 92 stores the data stored in the above-described storage unit 24. The communication I/F unit 93 is an interface for connecting to an external device or an external terminal via a communication line or the like to perform data transmission and reception with the connected external device or external terminal. The display unit 91 corresponds to each of the display unit 26 and the display unit 12C described above. The input unit 94 receives a user's operation instruction. The input unit 94 corresponds to the input unit 12B and the input unit 28 described above.

A program for executing the various types of processing executed by the information processing apparatus 10, the terminal device 12, and the external server 14 according to the present embodiment and the modifications is provided in the form of being preliminarily incorporated in the ROM 88. The program includes the information processing program.

The programs to be executed by the information processing apparatus 10, the terminal device 12, and the external server 14 according to the present embodiment and the modifications may be recorded and provided in a computer-readable recording medium such as a CD-ROM, flexible disk (FD), CD-R, digital versatile disk (DVD) as files that can be installed in these apparatuses or in executable formats.

Alternatively, the programs executed by the information processing apparatus 10, the terminal device 12, and the external server 14 according to the present embodiment and the modifications may be stored on a computer connected to a network such as the Internet to be provided by being downloaded via the network. Still alternatively, the program for executing the above-described processing in the information processing apparatus 10, the terminal device 12, and the external server 14 according to the present embodiment and the modifications may be provided or distributed via a network such as the Internet.

The programs for executing the various types of processing executed on the information processing apparatus 10, the terminal device 12, and the external server 14 according to the present embodiment and the modifications are designed such that the above-described components are generated on the main storage device.

Note that various types of information stored in the HDD 92 may be stored in an external device. In this case, the external device and the CPU 86 may be connected via a network or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more hardware processors configured to:
   extract, by using a learning model for extracting a combining region from a subject image, the combining region from a first subject image of a first subject; and
   generate a combined image obtained by combining the combining region with a target region of a corrected image in which transparency of the target region in a second subject image of a second subject has been corrected to a threshold or more, wherein
   generation of the combined image comprises combining the combining region with the target region of the corrected image obtained by adjusting an alpha value indicating the transparency of a boundary region between an inside and an outside of the target region in the second subject image so as to be stepwise or continuously reduced from the inside of the target region to the outside of the target region, and
the one or more hardware processors are further configured to:
   correct a color tone of the combining region such that a difference between a color tone of a feature region characteristically representing a skin color and including a nose tip region, a nostril region, and a skin region adjacent the nose tip region in the first subject image and a color tone of the feature region in the second subject image is a predetermined value or less, yielding a corrected combining region; and
   generate the combined image by combining the corrected combining region with the target region of the corrected image.

2. The apparatus according to claim 1, wherein the second subject image, in which the transparency is corrected, is an image including a face and clothing of the second subject.

3. The apparatus according to claim 1, wherein the second subject image, in which the transparency is corrected, is an image including a trial target site of the first subject.

4. The apparatus according to claim 3, wherein the trial target site is at least one of a hair site, a skin site, or an item worn by the second subject.

5. The apparatus according to claim 3, wherein the combining region is a region adjacent to the trial target site in the first subject image.

6. The apparatus according to claim 5, wherein the trial target site is a hair site, and the combining region is a face region in the first subject image.

7. The apparatus according to claim 1, wherein the combining region and the target region of the corrected image are rectangular regions.

8. The apparatus according to claim 1, wherein the one or more hardware processors are further configured to:
   reshape the corrected image so that the target region of the corrected image and the combining region match with each other to yield a reshaped corrected image; and
   generate the combined image by combining the combining region with the target region of the reshaped corrected image.

9. The apparatus according to claim 1, wherein the one or more hardware processors are configured to generate the combined image for which at least one of a region between the first subject's nose and lips or a cheek region is the skin region.

10. The apparatus according to claim 1, wherein the one or more hardware processors are further configured to output the combined image.

11. The apparatus according to claim 10, wherein the one or more hardware processors are further configured to output the combined image and related information related to the second subject image corresponding to the corrected image used for combining the combined image.

12. The apparatus according to claim 11, wherein the related information is at least one of: supplementary information related to the second subject image; affinity between the feature of the first subject and a trial target site of the second subject image; a user name other than the first subject similar to the combined image; characteristic information indicating a characteristic of the combined image; or difference information indicating a difference between the first subject and the second subject.

13. The apparatus according to claim 11, wherein
the one or more hardware processors are further configured to output the combined image selected based on the related information among the plurality of generated combined images.

14. An information processing method implemented by a computer, the method comprising:
using a learning model to extract a combining region from a first subject image of a first subject; and
generating a combined image obtained by combining the combining region with a target region of a corrected image in which transparency of the target region in a second subject image of a second subject has been corrected to a threshold or more, wherein
the generating comprises generating the combined image obtained by combining the combining region with the target region of the corrected image obtained by adjusting an alpha value indicating the transparency of a boundary region between an inside and an outside of the target region in the second subject image so as to be stepwise or continuously reduced from the inside of the target region to the outside of the target region, and
the method further comprises:
correcting a color tone of the combining region such that a difference between a color tone of a feature region characteristically representing a skin color and including a nose tip region, a nostril region, and a skin region adjacent the nose tip region in the first subject image and a color tone of the feature region in the second subject image is a predetermined value or less, wherein the correcting yields a corrected combining region; and
generating the combined image by combining the corrected combining region with the target region of the corrected image.

15. A computer program product comprising a non-transitory computer-readable recording medium including an information processing program, the program causing a computer to execute:
using a learning model to extract a combining region from a first subject image of a first subject; and
generating a combined image obtained by combining the combining region with a target region of a corrected image in which transparency of the target region in a second subject image of a second subject has been corrected to a threshold or more, wherein
the generating generates the combined image obtained by combining the combining region with the target region of the corrected image obtained by adjusting an alpha value indicating the transparency of a boundary region between an inside and an outside of the target region in the second subject image so as to be stepwise or continuously reduced from the inside of the target region to the outside of the target region, and
the program causes the computer to further execute:
correcting a color tone of the combining region such that a difference between a color tone of a feature region characteristically representing a skin color and including a nose tip region, a nostril region, and a skin region adjacent the nose tip region in the first subject image and a color tone of the feature region in the second subject image is a predetermined value or less, wherein the correcting yields a corrected combining region; and
generating the combined image by combining the corrected combining region with the target region of the corrected image.

* * * * *